June 29, 1943.    R. J. BARRY    2,323,273
PANEL CONNECTION
Filed Nov. 20, 1942    2 Sheets-Sheet 1

INVENTOR.
RICHARD J. BARRY.
BY
Ely & Pattison
ATTORNEYS.

June 29, 1943.   R. J. BARRY   2,323,273
PANEL CONNECTION
Filed Nov. 20, 1942   2 Sheets-Sheet 2
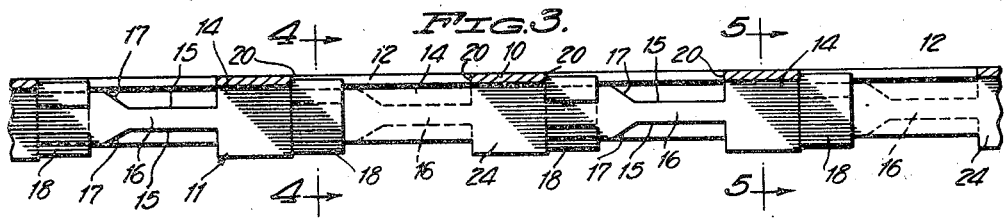
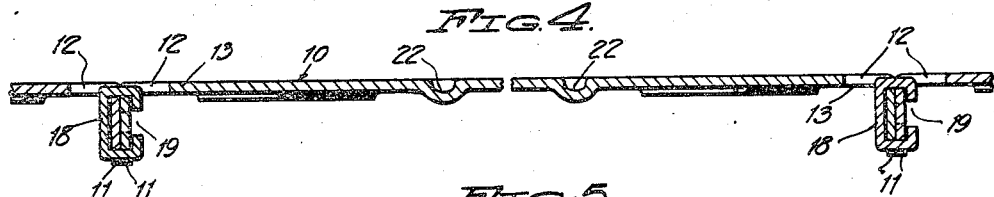
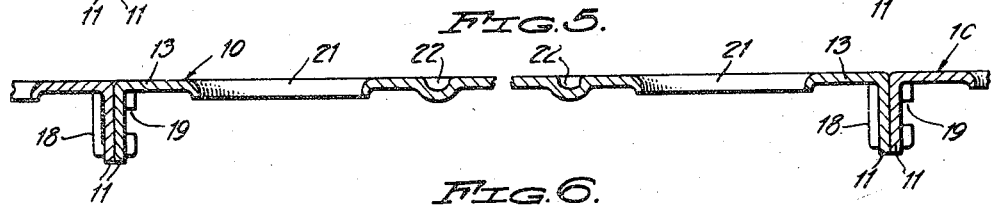
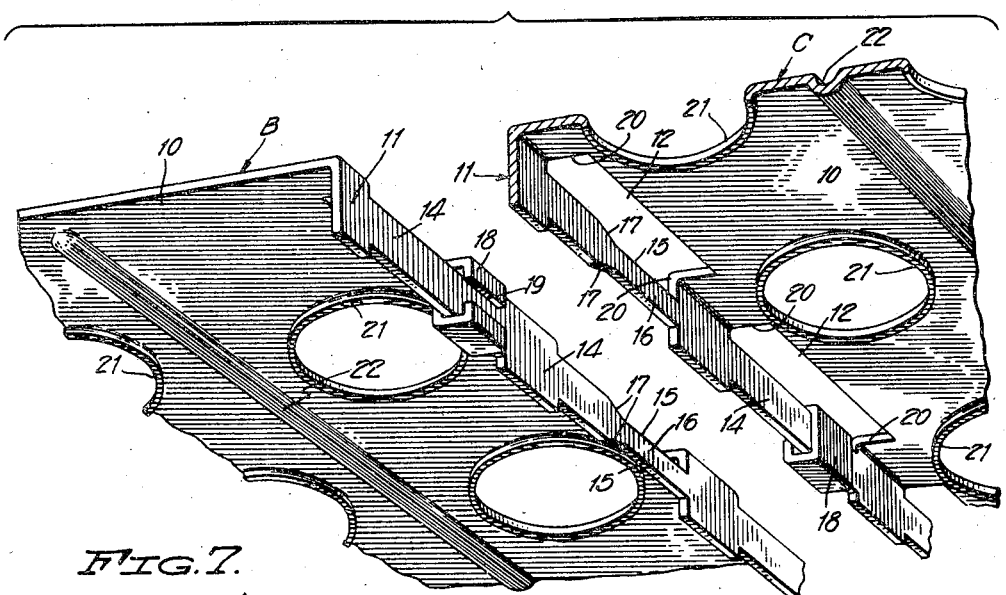
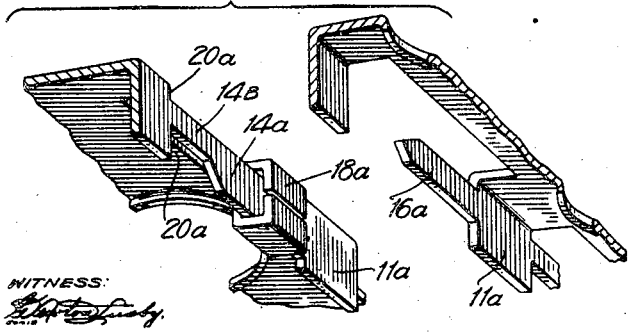
INVENTOR.
RICHARD J. BARRY.
BY
ATTORNEYS.

Patented June 29, 1943

2,323,273

UNITED STATES PATENT OFFICE 2,323,273

PANEL CONNECTION

Richard J. Barry, New York, N. Y., assignor to Walter Edward Irving, Glenbrook, Conn.

Application November 20, 1942, Serial No. 466,348

7 Claims. (Cl. 94—13)

This invention relates to improvements in panel connections and has particular reference to coupling means for connecting adjacent metal plate panels together to form an emergency airfield landing mat.

Heretofore, steel plate landing mat panels have been coupled together by a fastening means embodying pointed hooks disposed along their outer edges. Such a coupling has not proven satisfactory, due in part, to the fact that the hooks become bent in transit and during handling, which makes it difficult to affect a quick coupling when the panels are laid side by side to form an emergency landing field for airplanes. Furthermore, the aforesaid coupling means embodying the pointed hooks are likely to cause body injury to persons handling the same and to cause tearing of the clothes of persons handling the panels. Also, the joints between adjacent plate panels are loose and the edges of the panels protrude above the surface, and it is difficult to remove a panel which might become damaged. Therefore, the primary object of this invention is to provide a coupling means for steel plate landing mat panels which eliminate sharp projections along the sides of the panels to prevent injury and tearing of the clothes of a wearer; to expedite the coupling of the mat panels in the field; to provide a tight rigid connection between the connected panels; and to permit the quick and easy removal of any damaged panels without disturbing or damaging any adjacent panel.

Another feature of the invention resides in a coupling means for steel plate landing mats in which the longitudinal sides of adjacent panels are rigidly secured in abutting engagement with the upper surfaces of the panels disposed in the same horizontal plane to provide flush joints over which the wheels of a landing airplane may roll smoothly.

A still further feature of the invention is to embody the coupling means set forth in my copending patent application for Grating, Serial No. 431,503, filed February 19, 1942, in an emergency airfield landing mat made of metal plate panels, each of which is inverted U-shape in cross section.

Additional features of the invention are to provide a metal plate panel and coupling means therefor which is relatively light in weight; easy to pack by stacking one upon the other; and simple and inexpensive of manufacture.

Other novel features of the invention will become apparent as the following specification is read in conjunction with the accompanying drawings, in which:

Figure 3 is an enlarged detail vertical longitudinal sectional view on the line 3—3 of Figure 2.

Figure 4 is a vertical transverse sectional view on the line 4—4 of Figure 3.

Figure 5 is a view similar to Figure 4, but taken on the line 5—5 of Figure 3.

Figure 6 is a sectional elevational perspective view of the locking edges of two adjacent panels, said panels being in separated position and looking at the underside thereof.

Figure 7 is a view similar to Figure 6 showing a modified form of coupling means.

Figure 1:
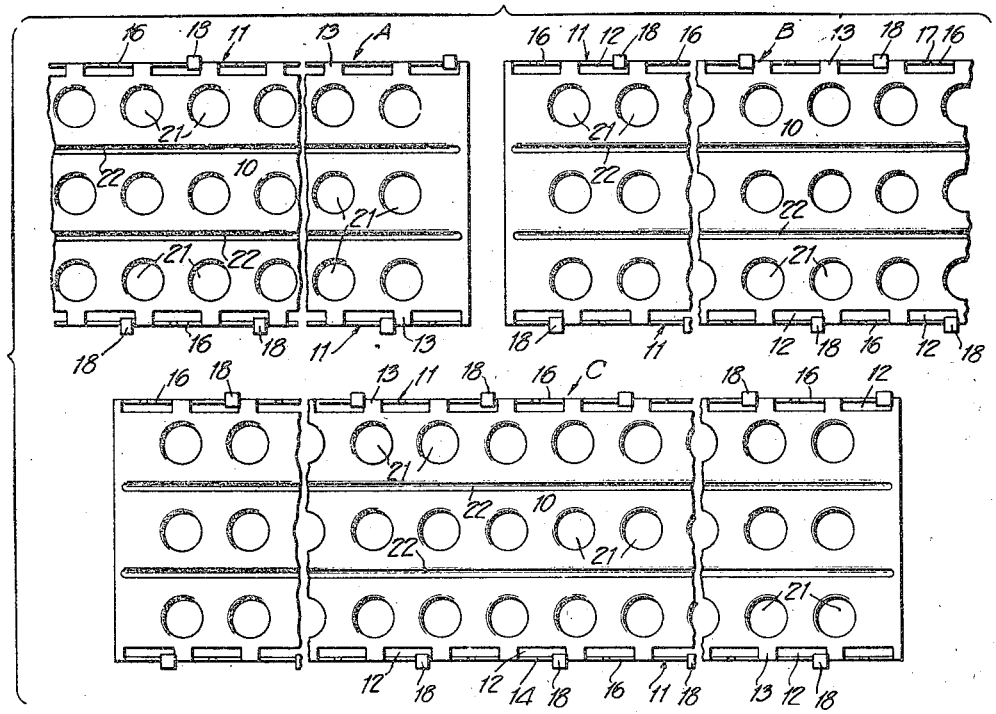
Figure 1 is a fragmentary top plan view of a plurality of metal plate panels about to be coupled together.

Referring to the drawings by reference characters, the letters A, B, and C represent three separate panels constructed in accordance with the invention, and which are to be coupled together to provide a continuous airplane landing mat for emergency airfields. Whereas the invention about to be described is adaptable for use as portable landing fields for aircraft, it is to be understood that panels for other purposes, such as partition structures and the like may be releasably joined together and the panels arranged in vertical position rather than in the horizontal position shown in the drawings. Also, the invention may be embodied in flooring structures, and the armoring of floors, etc.

Each of the mat panels comprises a rectangular rigid plate 10 and for use in the construction of a landing mat, the panel 10 is of steel of approximately one-eighth inch in thickness.

Figure 2:
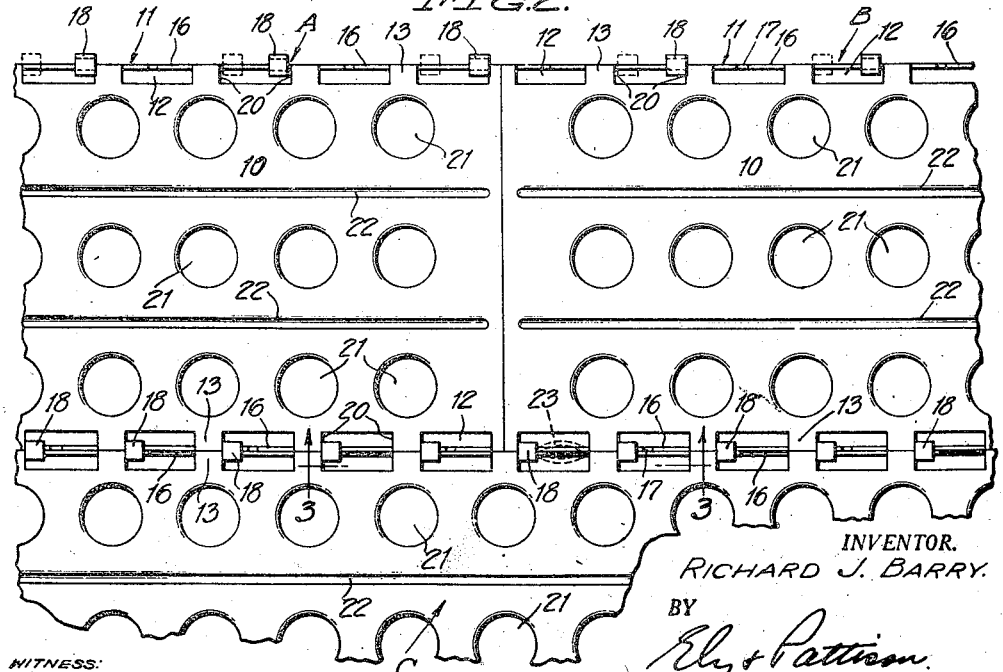
Figure 2 is an enlarged view similar to Figure 1 showing the several panels connected together.

The plate 10 is of inverted U-shape in cross section to provide straight continuous downwardly extending side flanges 11—11 integral with the longitudinal edges of the plate 10. The plate 10 is provided with a row of equidistantly spaced elongated slots 12 along its longitudinal edges, the material of the plate between adjacent slots constituting connecting webs 13. The slots 12 are punched before bending of the downturned flanges 11—11 and extend into the top exposed edges of the flanges for a distance equal to or slightly greater than the thickness of the metal coupling slide members hereinafter to be described. The slots 12 define spaced elongated coupling portions 14 along the length of the flanges 11—11. Alternate coupling portions 14 of the flanges are formed with opposed notches 15—15 extending inwardly from the top and bottom edges of the flanges to provide each alternate coupling portion with a restricted portion 16. One of the end walls of the notches 15—15 are inclined as at 17—17. The alternate notched coupling portions 14 along one longitudinal edge are offset relative to the like notched coupling portions 14 along the other edge as best illustrated in Figures 1 and 2. The unnotched alternate coupling portions 14 along each flange 11 have C-shaped coupling members 18 slidably and captively mounted thereon. Each C-shaped coupling member 18 has its open mouth 19 facing outwardly and the size of the mouth is slightly greater than the width of the reduced portion 16 which it is to receive during a coupling operation. The cross-sectional space within each C-shaped coupling member 18 is of a size to receive the cross sectional areas of two abutting portions 14—14 of a pair of adjacent connecting panels. The ends 20—20 of each slot 12 between which a coupling member 18 is slidably mounted, act as stops for limiting the range of sliding movement of the coupling member.

In order to reduce the weight of the plate 10, the same is provided with three longitudinal rows of equi-distantly spaced transversely alined openings 21, said openings also permitting grass to grow therethrough when the panels are used as an emergency landing field to provide a camouflage therefor. In order to strengthen the plate 10, the same is formed between adjacent rows of openings 21 with downwardly punched ribs 22, the ends of which may terminate short but adjacent the ends of the plate.

In practice, the plate panels A, B, and C in Figure 1 are about to be coupled together along adjacent longitudinal sides. The panels A and B are arranged in end to end relation and the panel C lapping said ends and adapted to be coupled to the adjacent longitudinal sides of the panels A and B. With the adjacent ends of the panels A and B abutting, the panel C is shifted to cause one of its flanges 11 to abut adjacent flanges 11—11 of the panels A and B. The coupling slide members 18 of one panel are brought into confronting relation to the respective notched connecting portions 14 of the adjacent panel. The slide members 18 may be slid to their releasing position by tilting the panels endwise as they are laid in position, so that their open mouths 19 will be in confronting relation to the reduced portions 16 which they are to respectively receive. With the C-shaped coupling members of one panel in release position and respectively alined with the reduced portions 16 of the panel or panels to be coupled therewith, an operator may successively strike the slide members 18 with a hammer to slide them in a direction toward and over the inclined surfaces 17 and onto the unnotched adjacent portions of the flanges, at which time the C-shaped coupling members clampingly embrace the abutting portions 14—14 of adjacent plate panels. To prevent accidental sliding of the C-shaped coupling members when in locking position, a pointed implement may be inserted between each reduced portion 16 and abutting adjacent flange 11 and the instrument given a blow with a hammer to deform or spread the adjacent portions of the abutting parts as shown in dotted lines at 23 in Figure 2. When it is desired to disconnect the panels, a fork-like tool may be inserted in the opposed slots 12 of adjacent panels to engage behind each coupling member 18, and a hammer blow imparted to the instrument to forcibly drive the coupling member to releasing position with its open mouth 19 in alinement with the reduced portion 16.

The lower edges of the side flanges 11 are cut away at spaced distances apart to provide spaced supporting legs 24 to space the bottom portions of the C-shaped coupling members from contact with a supporting surface. However, when the plate panels are used as a landing mat and placed upon soft ground, the flanges 11 may become embedded in the ground and act as anchors against the force imparted thereto during the landing thereon of an airplane, it being understood that airplanes are intended to land upon the mat panels transversely thereof. The tops of the C-shaped coupling members 18 are disposed below the plane of the upper traction surface of the plate so as not to obstruct the free rolling of an airplane over the joints between the connected panels.

In Figure 7 of the drawings, I have illustrated a modified form of coupling wherein a spear shaped tongue 16a may be substituted for each alternate reduced portion 16 and a substantially closed slide ring 18a takes the place of the C-shaped coupling member 18. When the slide ring 18a is applied to its coupling portion 14a, the free ends are in a spread apart position to freely pass over the reduced portion 14b, after which the ends are pressed into substantially closed position and the ring 18a is captively and slidably supported upon its coupling portion 14a. To effect a coupling between the tongue 16a of one panel and the ring 18a of an adjacent panel, the ring is slid to a position against the shoulders 20a formed by the reduced portion 14b so as to be clear of the pointed end of the tongue 16a with which it is to be coupled, whereupon the flanges 11a—11a may be brought into abutting engagement and the ring 18a slid over the tongue 16a to locking position. If desired, the free end of the tongue 16a may be bent outwardly to prevent accidental sliding of the ring 18a from its locking position to its releasing position.

While the releasable coupling means is shown along the longitudinal sides of the panels, it will be understood that they may also be provided along the transverse ends of the panels for securing the abutting ends of the panels together.

Having described what I consider to be the preferred embodiment of the invention, I wish it to be understood that such changes in construction and design as come within the scope of the appended claims may be resorted to if desired.

Having thus described the invention, what I claim as new and desire to secure by Letters Patent, is:

1. A sectional airplane landing mat including a flat metal plate panel having a depending side flange integral therewith, a reduced coupling portion provided in said side flange, a companion panel having a depending side flange integral therewith flatly abutting the first side flange, a C-shaped coupling member slidably mounted upon the second side flange having its open side facing the first side flange to freely receive the reduced coupling portion to cause the same to clampingly embrace both side flanges to prevent separation of the panels one from the other.

2. A sectional airplane landing mat including a pair of like flat metal plate panels, each of said metal plate panels having a downwardly extending side flange integral therewith, the panel adjacent the side flange having a row of equidistantly spaced elongated slots provided therein defining a plurality of spaced coupling portions along the flange, alternate coupling portions of the flange having opposed notches in the edges thereof defining reduced portions, C-shaped coupling members slidably mounted on the other alternate coupling portions of the flange with their open sides facing outwardly, said panels being arranged with their side flanges in abutting engagement with the notched coupling portions of one flange in confronting relation to the C-shaped coupling members of the other flanges to facilitate the passage of the open sides of the coupling members through the opposed notched coupling portions to enable the sliding of the coupling members beyond one end of the notches into clamping engagement with the unnotched portions of the flanges to secure the metal plate panels against separation.

3. A sectional airplane landing mat including a pair of like flat metal plate panels, each of said plate panels having a straight side edge, equi-distantly spaced webs extending from the straight side edge and being integral with the panel, a downwardly extending flange integral with the webs and extending substantially the length of the straight side edge, C-shaped coupling members slidably mounted on said flange between adjacent alternate pairs of webs with their open sides facing outwardly, the flange between the other alternate pairs of webs having reduced portions of a length less than the distance between adjacent webs, the pair of panels being arranged with their flanges in side to side abutting engagement with the C-shaped coupling members of one flange in opposed relation to the reduced portions of the other flange, and vice-versa, to facilitate the passage of the open sides of the coupling members through the respective opposed reduced portions to enable the sliding of the coupling members beyond one end of the reduced portions into coupling engagement with both flanges.

4. A sectional mat panel comprising a rectangular shaped plate having downwardly extending side flanges integral with the opposed longitudinal side edges thereof, the panel adjacent each longitudinal side edge having a row of equi-distantly spaced elongated slots provided therein defining a plurality of spaced coupling portions along the flanges, alternate coupling portions of each flange having opposed notches in the edges thereof defining reduced portions, the notched coupling portions along one side flange being staggered relative to the notched coupling portions along the other side flange, C-shaped coupling members slidably mounted on the other alternate coupling portions of the side flanges with their open mouths facing outwardly to enable the same to be brought into coupling relation to the reduced portions of the flanges of companion panels to facilitate the sliding of the coupling members thereon.

5. A portable airplane landing mat comprising in combination, a flat rigid panel having continuous downwardly extending side flanges integral with opposed longitudinal side edges to provide supporting legs, a like companion panel having one of its side flanges in abutting engagement with a side flange of the first mentioned panel, releasable interlocking means provided along the abutting side flanges for rigidly coupling the same together, said interlocking means comprising C-shaped coupling members slidably and captively mounted in staggered spaced relation upon the abutting side flanges, and spaced coupling elements provided on the abutting side flanges in confronting relation to the respective C-shaped coupling members and with which the same slidably embrace.

6. A portable airplane landing mat comprising in combination, a flat rigid panel having continuous downwardly extending side flanges integral with the opposed longitudinal side edges to provide supporting legs, a like companion panel having one of its side flanges in abutting engagement with a side flange of the first mentioned panel, releasable interlocking means provided along the abutting side flanges for rigidly coupling the same together, said interlocking means comprising ring-like coupling members slidably and captively mounted in spaced relation upon the abutting side edges, and spaced pointed coupling tongues provided on the abutting side flanges in confronting relation to the respective ring-like coupling members and with which the respective ring-like coupling members slidably embrace.

7. A portable airplane landing mat comprising, in combination, panels having substantially flat face portions disposed in flat-wise edge to edge abutting relation, flat angularly extending side flanges extending from the abutting edges of the panels arranged in abutting confronting relation, and interlocking means provided along the flat abutting side flanges for rigidly coupling the same together, said interlocking means comprising a slide element captively mounted on one of said flat side flanges for sliding movement in a direction substantially parallel to the plane thereof, said slide element engaging a tongue element on the other side flange.

RICHARD J. BARRY.